United States Patent
Osborne

(10) Patent No.: US 7,848,613 B2
(45) Date of Patent: Dec. 7, 2010

(54) RESIDUAL TIME-SHIFT BUFFERING IN A DIGITAL MEDIA DEVICE

(76) Inventor: Jason Osborne, 610 Sterling Oaks Dr., Lilburn, GA (US) 30047

( * ) Notice: Subject to any disclaimer, the term of this patent is extended or adjusted under 35 U.S.C. 154(b) by 1182 days.

(21) Appl. No.: 11/427,752

(22) Filed: Jun. 29, 2006

(65) Prior Publication Data

US 2008/0002938 A1 Jan. 3, 2008

(51) Int. Cl.
*H04N 5/91* (2006.01)
(52) U.S. Cl. ............................. 386/83; 386/95; 386/112
(58) Field of Classification Search ................... 386/46, 386/83, 95, 125
See application file for complete search history.

(56) References Cited

U.S. PATENT DOCUMENTS

| 5,438,423 | A | * | 8/1995 | Lynch et al. | ................ | 386/109 |
| 6,311,011 | B1 | * | 10/2001 | Kuroda | ........................ | 386/46 |
| 7,577,336 | B2 | * | 8/2009 | Srinivasan et al. | ............ | 386/95 |
| 2002/0199185 | A1 | | 12/2002 | Kaminski et al. | | |
| 2003/0108331 | A1 | | 6/2003 | Plourde, Jr. et al. | | |
| 2005/0111819 | A1 | * | 5/2005 | Cormack et al. | .............. | 386/46 |
| 2009/0310937 | A1 | * | 12/2009 | Ellis et al. | ..................... | 386/83 |

FOREIGN PATENT DOCUMENTS

| WO | WO 2005/069612 A1 | 7/2005 |
| WO | WO 2006/015186 A2 | 2/2006 |

OTHER PUBLICATIONS

European Office Action dated Oct. 1, 2010 cited in Application No. 07 798 681.8—2202.

* cited by examiner

*Primary Examiner*—Huy T Nguyen
(74) *Attorney, Agent, or Firm*—Merchant & Gould

(57) ABSTRACT

Systems and methods for managing time-shift buffering in a digital media recording device are disclosed. One embodiment of a method comprises receiving media content through at least a first tuner of the digital media recording device, the media content comprising at least a first instance of media content received consecutive to a second instance of media content. The method further includes directing the first instance of media content into a first time-shift buffer, the first instance of the media content received through the first tuner of the digital media recording device. After directing the first instance of the media content into the first time-shift buffer, the second instance of media content is directed into one of the first time-shift buffer and a second time-shift buffer while continuing to direct media content received through the first tuner of the digital media recording device into the first time-shift buffer for at least a predetermined duration of time.

23 Claims, 8 Drawing Sheets

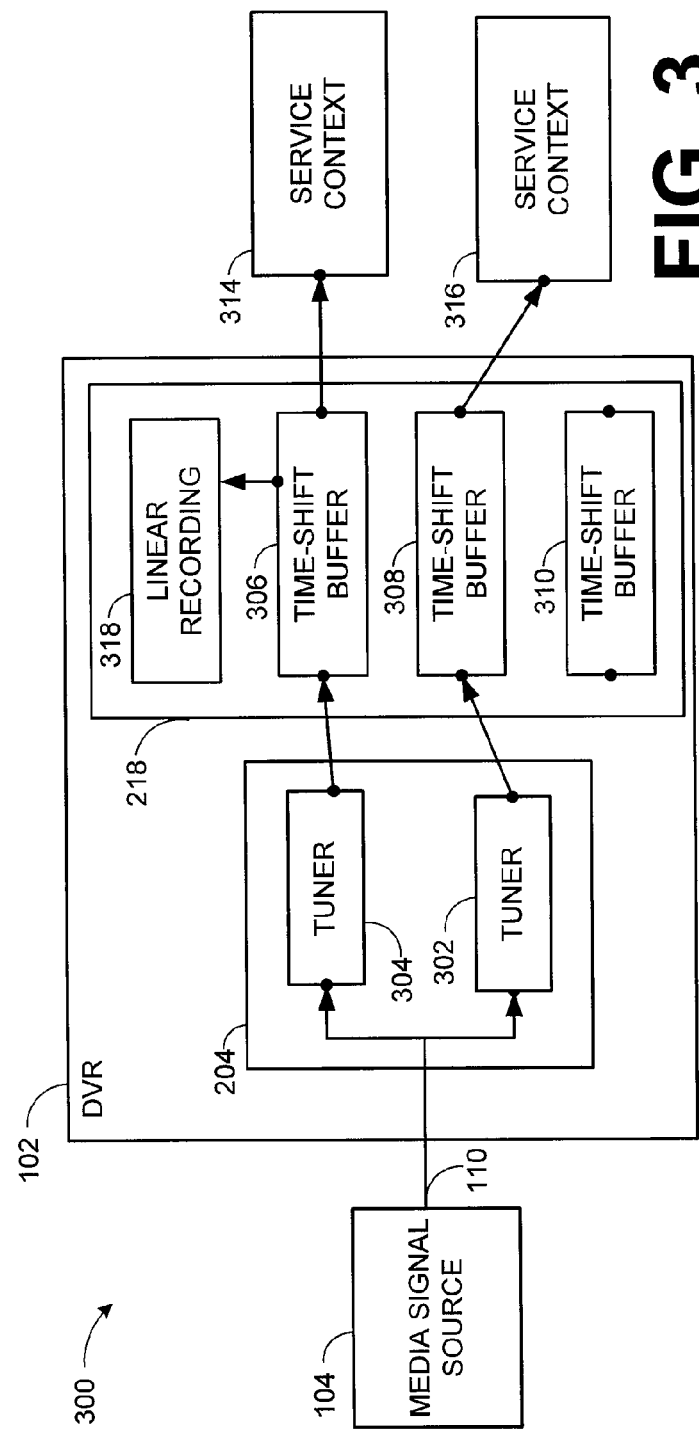

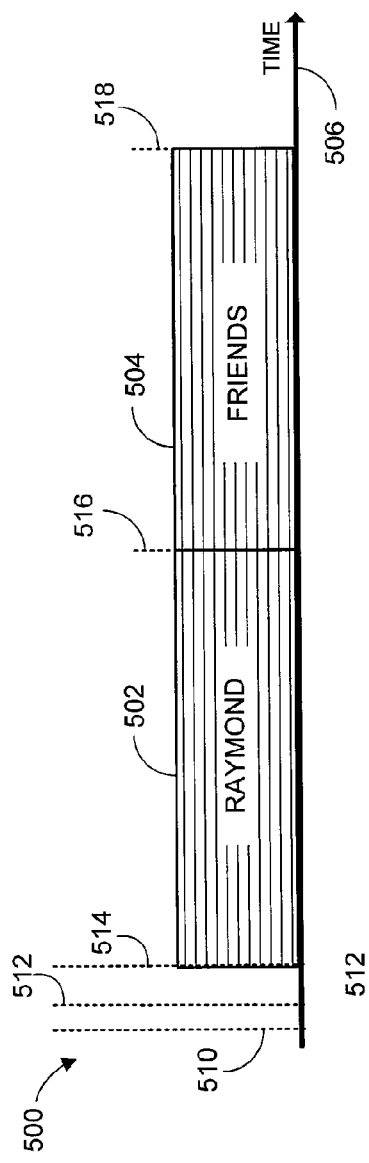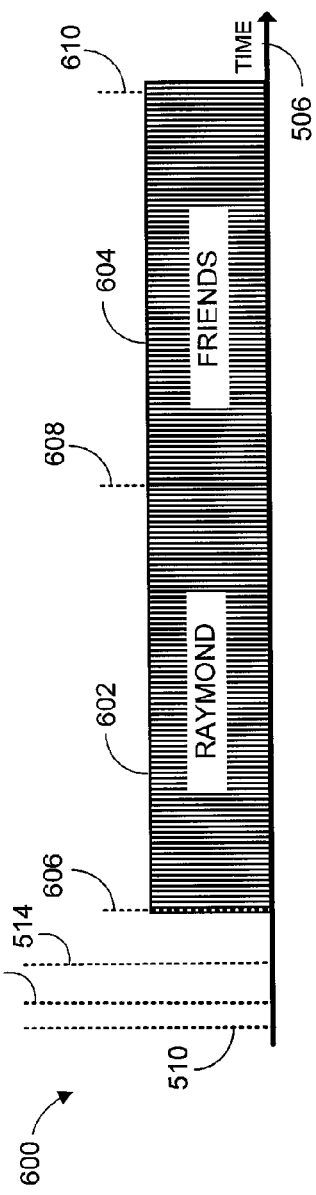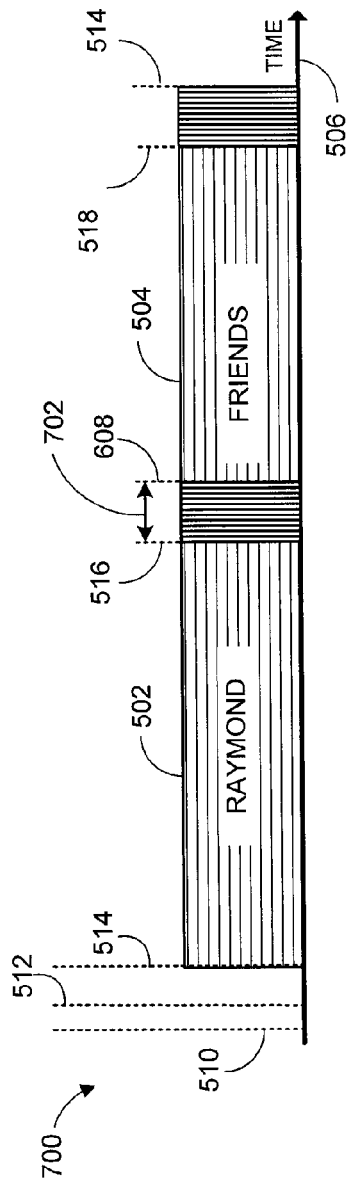

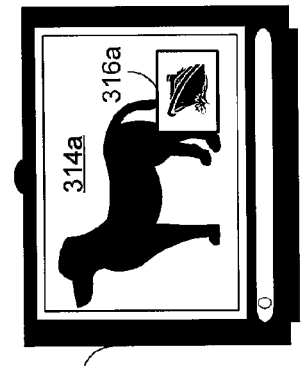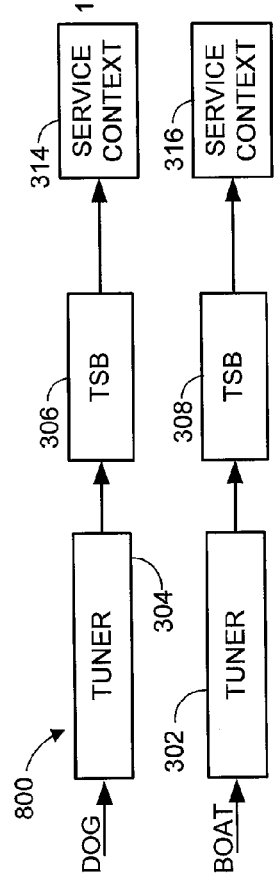
FIG. 8
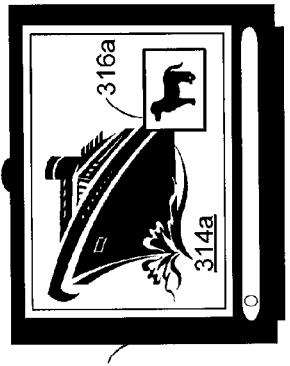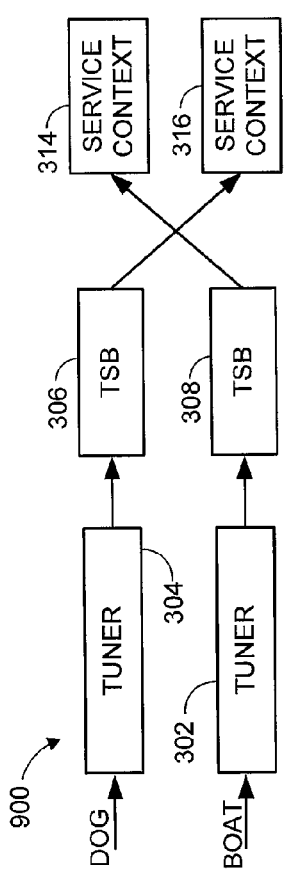
FIG. 9
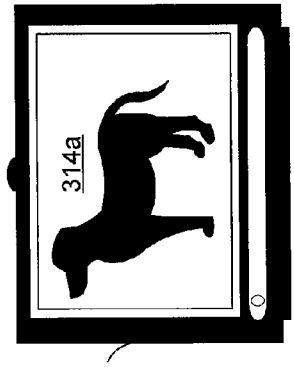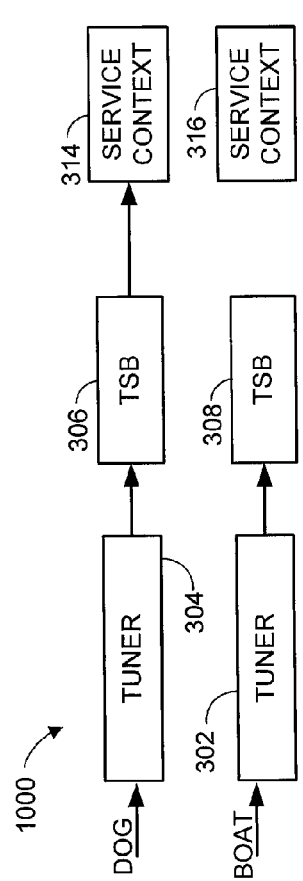
FIG. 10

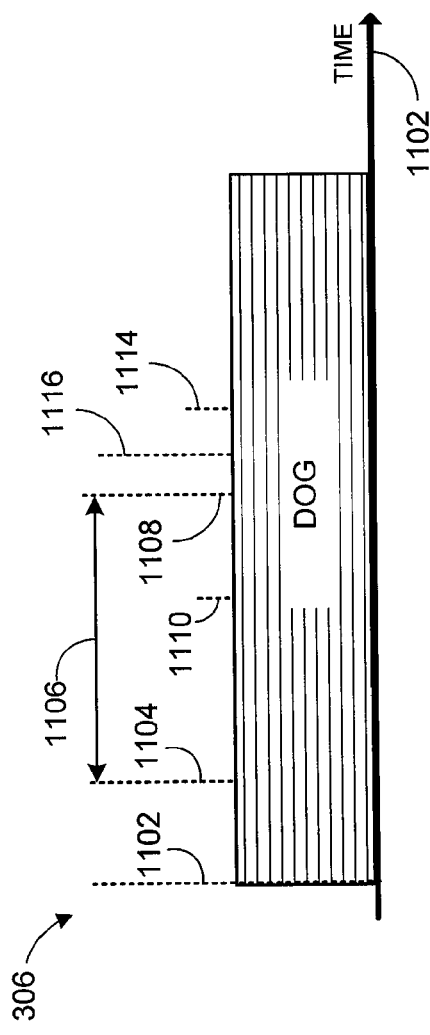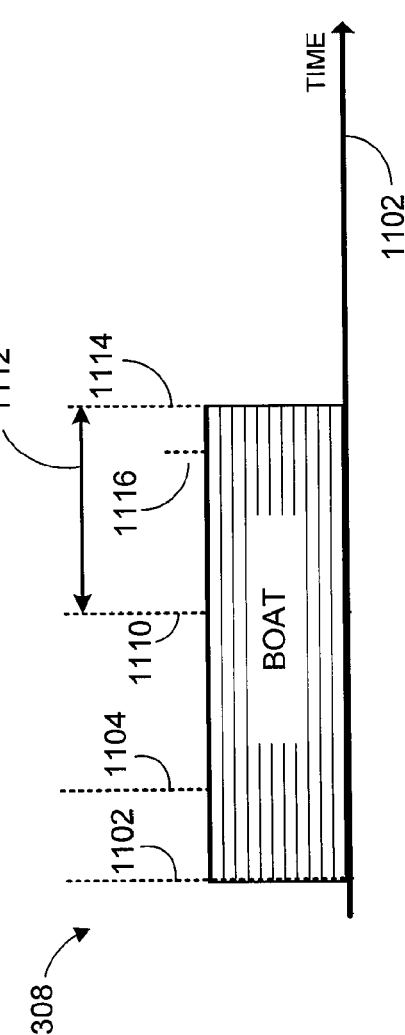

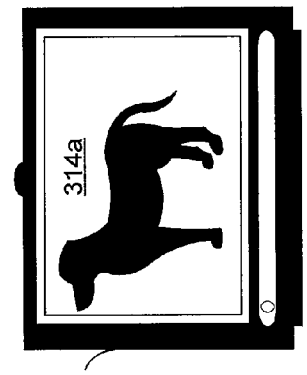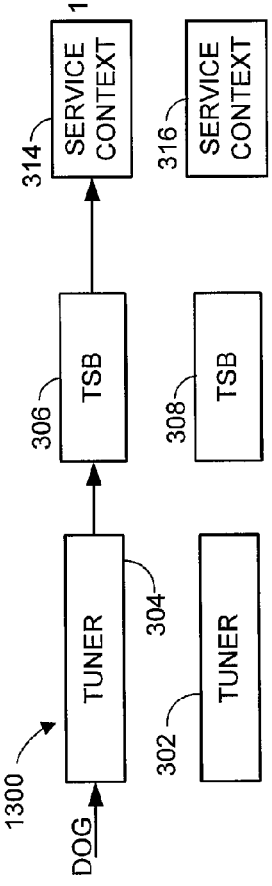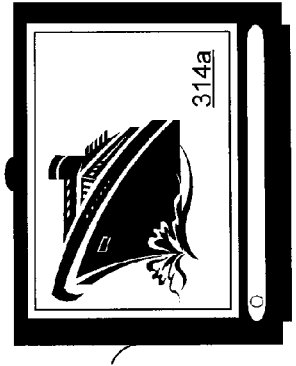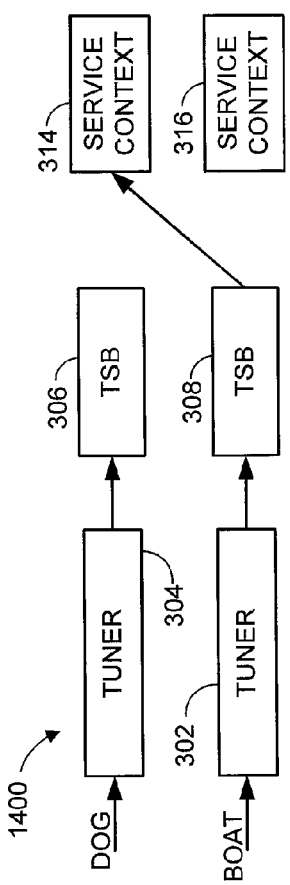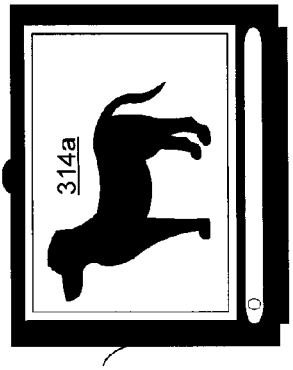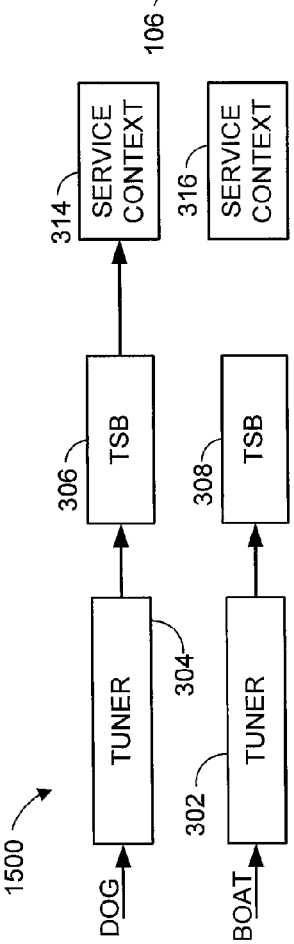
FIG. 13
FIG. 14
FIG. 15

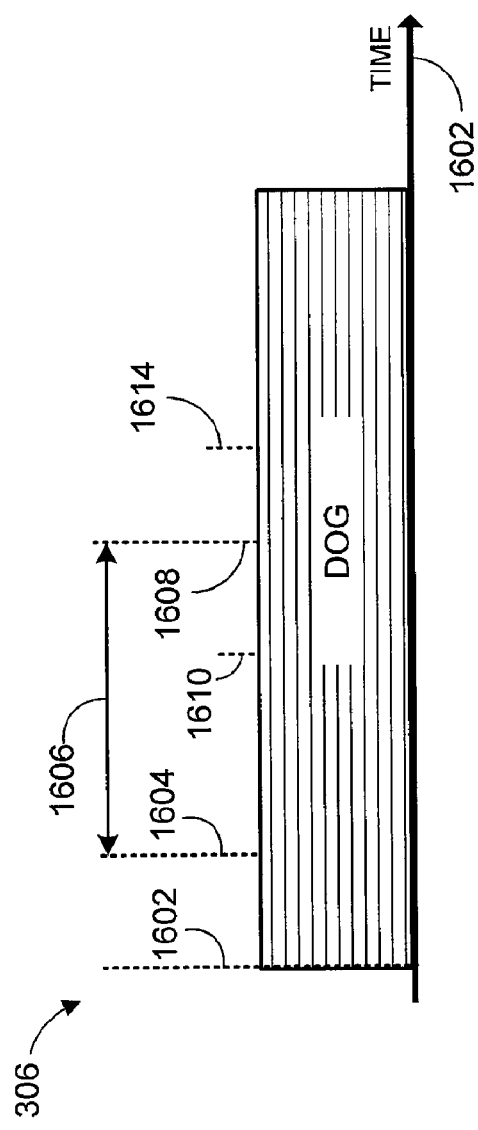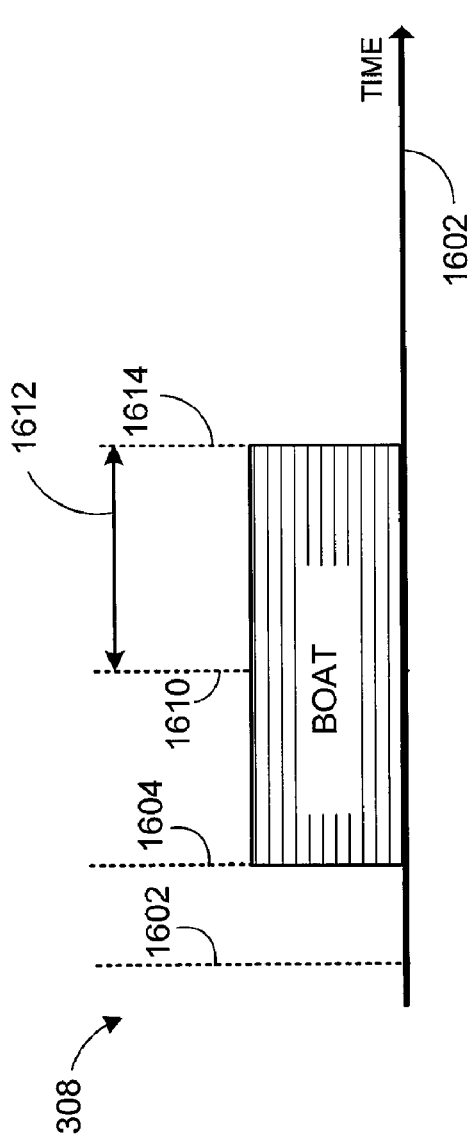

RESIDUAL TIME-SHIFT BUFFERING IN A DIGITAL MEDIA DEVICE

BACKGROUND

1. Technical Field

The present disclosure generally relates to digital media devices, and more specifically, to time-shift buffering in a digital media device.

2. Description of the Related Art

Digital media recording devices can be used for recording media signals, such as audio and/or video signals, in a digital format. Such devices may also be used for the storage and playback of such signals. One specific example of such a digital media recording device may be referred to as Digital Video Recorder (DVR) or Personal Video Recorder (PVR).

In general, a DVR may be used to schedule and record future television programs, for buffering live television programs in a time-shift buffer, and/or playback of the digitally recorded television programs. The incoming media signals representing the television programs may be received, potentially decrypted and/or encoded, and digitally stored on a storage medium. The storage medium is commonly a non-volatile storage device such as a hard disk drive (HDD) (i.e., hard drive), among other acceptable mediums. Such an HDD can write the digital media data on a magnetic surface of the HDD disk platters and read the media data at later times for playback.

A conventional DVR may first record incoming media content to a time-shift buffer, and if desired, this media content may then be stored to a more permanent linear recording. However, using conventional designs, recording media content to the time-shift buffer before storing the media content to the more permanent linear recording can introduce problems affecting the user experience. For example, in the case of consecutively recorded (i.e., back-to-back) linear recordings, the second of the recordings may lose a portion of the beginning of the desired content. Specifically, according to conventional DVR designs, the time-shift buffer is stopped and restarted (i.e. which can include flushing the recorded media content out of the buffer) in between scheduled recordings. One potential effect of this is that, if a second tuner (which may have its own associated time-shift buffer) is not available to service the second of the back-to-back recordings, the second recording is delayed until the first recording finishes a conversion from the time-shift buffer to a permanent linear recording. Once the first of the back-to-back recordings finishes its conversion, the second recording may begin directing media content to the restarted time-shift buffer resource, which could be several seconds or minutes later (thus a portion of the beginning of the second requested media content is lost).

Additionally, regardless of whether linear recordings are first stored to a time-shift buffer, conventional DVRs are configured to reset the time-shift buffers when service contexts are attached and/or detached. Such service contexts are, for example, the main output for display and/or a PIP display. Accordingly, actions such as channel changes or picture-in-picture (PIP) swaps may cause media content previously recorded to a particular time-shift buffer associated with the service context to be discarded. Thus, if a user channel surfs from a first channel to a second channel, the buffer associated with the first channel is reset and the second channel begins using a fresh time-shift buffer. Thus, as a consequence, the user cannot rewind through media content previously recorded to the time-shift buffer while viewing the first channel. This is true even if the user switches back to the first channel. Similarly, if a PIP display includes a first channel as the main display and a second channel as the PIP, any content previously saved to a time-shift buffer associated within the main or PIP displays may be discarded and no longer accessible after swapping between the main and PIP display.

Accordingly, it is desirable to provide a media recording device that can be configured to mitigate these potential deficiencies, among others.

BRIEF DESCRIPTION OF THE DRAWINGS

The components in the drawings are not necessarily to scale relative to each other. Like reference numerals designate corresponding parts throughout the several views.

FIG. 3 depicts a simplified block diagram illustrating an embodiment of the DVR of FIG. 2 and depicting exemplary internal data paths for recording to a time-shift buffer, playing from a time-shift buffer, and/or converting from a time-shift buffer to a linear recording.

FIG. 4 depicts a graphical user interface of an exemplary program guide that can be displayed by a UI manager application 232 of the DVR of FIG. 2.

FIG. 5 depicts a buffer content diagram depicting the contents of an exemplary time shift buffer of the DVR of FIG. 2 with respect to time when recording back-to-back media content.

FIG. 6 depicts a diagram of the contents of exemplary linear recordings used to store media content converted from the time shift buffers of FIG. 5.

FIG. 7 is a diagram depicting an exemplary composite timing diagram of the contents of the time shift buffer of FIG. 5 and the linear recording of FIG. 6.

FIG. 8 depicts a simplified diagram of the DVR FIG. 2 in a first exemplary picture-in picture (PIP) configuration.

FIG. 9 depicts a simplified block diagram of the DVR of FIG. 2 in a second exemplary PIP configuration.

FIG. 10 depicts a simplified block diagram of the DVR of FIG. 2 in a third exemplary PIP configuration.

FIG. 11 depicts a representation of the contents of a first exemplary TSB of FIGS. 8-10 over a duration of time.

FIG. 12 depicts a representation of the contents of a second exemplary TSB of FIGS. 8-10 over a duration of time.

FIG. 13 depicts an exemplary simplified DVR configuration and resulting display at a time after a user first selects a first instance of media content to be displayed.

FIG. 14 depicts an exemplary second DVR configuration and resulting display at a time after a user selects a second instance of media content to be displayed.

FIG. 15 depicts an exemplary third DVR configuration and resulting display at a time after a user selects the first instance of media content again in order to be displayed.

FIG. 16 depicts a representation of the contents of an exemplary TSB of FIGS. 13-15 over a duration of time.

FIG. 17 depicts a representation of the contents of a second exemplary TSB of FIGS. 13-15 over the duration of time.

DETAILED DESCRIPTION

Figure 1:
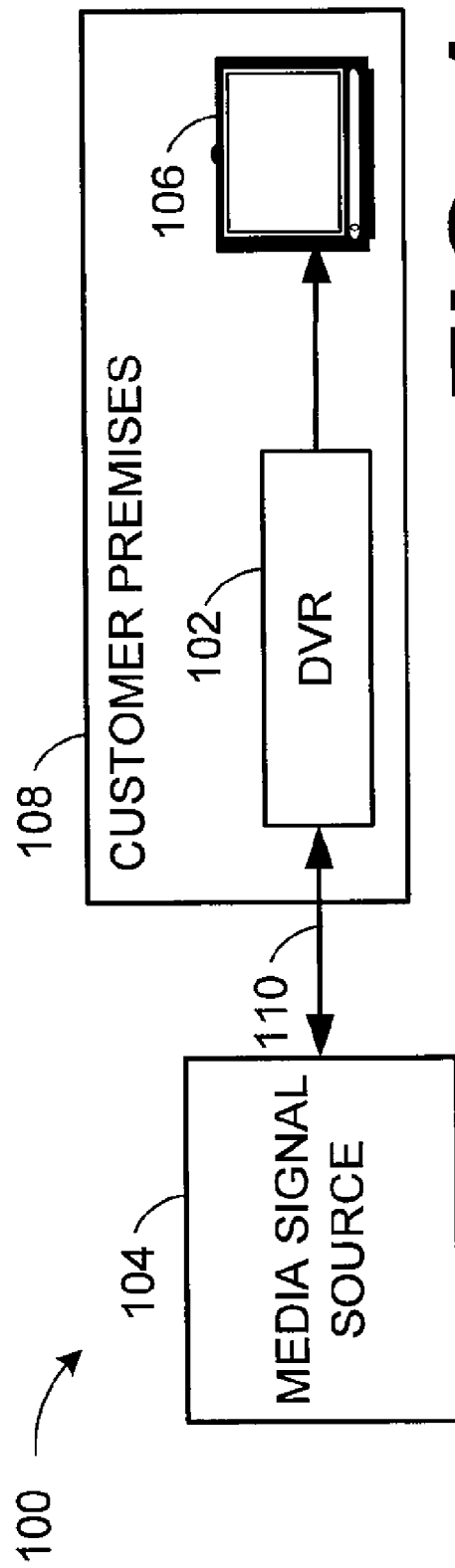
FIG. 1 depicts a block diagram of an arrangement of a digital video recorder (DVR) in accordance with embodiments of the present disclosure.

FIG. 1 depicts an embodiment of an arrangement 100 of a digital media recorder in accordance with embodiments of the present disclosure. According to embodiments described herein, the digital media recorder can be a digital video recorder (DVR) 102, which can be configured to record video and/or audio, among other media types. However, according to some embodiments, the digital media recorder could be, among other devices used for recording media digitally, a personal video recorder (PVR), a personal digital recorder (PDR), a personal computer, laptop computer, or personal digital assistant (PDA) configured to execute media recording capabilities. Within the context of this document, media content may also be referred to herein as media programs or media programming and is intended to broadly refer to media in any of the various physical embodiments, which could include, among others, stored or transmitted analog or digital signals. Additionally, reference may be made to media data, which is intended to specifically represent digitally encoded media content (i.e. audio signals, video signals, etc.).

According to some embodiments, DVR 102 may also be embedded within, or otherwise associated with, other electronic devices such as a cable television set-top box (STB), digital home communication terminal (DHCT), a tuner, a television, and/or a satellite-television receiver, among others. DVR 102 can be configured to receive digital and/or analog media signals (i.e. signals representing media content, such as audio, video, and/or text, among other media formats) from a media signal source 104, and may also be in communication with a playback device, such as television 106. The playback device could also be a computer display, portable device, audio receiver, among other devices capable of emitting or displaying media.

Media signal source 104 could be, but is not limited to, a satellite television source, an over-the-air broadcast source, a cable-television (CATV) system, or could be a provider of signals received over a network (i.e. LAN., WAN, Internet, etc.) from a remote source. Thus, it can be appreciated that media signal source 104 could be any of a number of sources of analog or digital media signals, such as video and/or audio signals that represent media content. Media signal source 104 can also transmit additional network data, including Internet traffic, teletext, closed-captioning, and programming guide information, among others. Media signal source 104 can transmit such signals over a communication channel 110 to DVR 102, which may be located at a customer premises 108. Although only one media signal source is depicted, it can be appreciated that DVR 102 could also accept media signals from more than one media signal source. For example, some embodiments of DVR 102 are capable of receiving signals from a CATV system as well as from an over-the-air transmitter.

Television 106 can, for example, receive and emit signals from DVR 102 representing the recorded (or non-recorded) media content. For example, television 106 may be capable of emitting the media content received by DVR 102. In some embodiments, television 106 is also used for displaying information associated with a graphical user interface generated by DVR 102.

Figure 2:
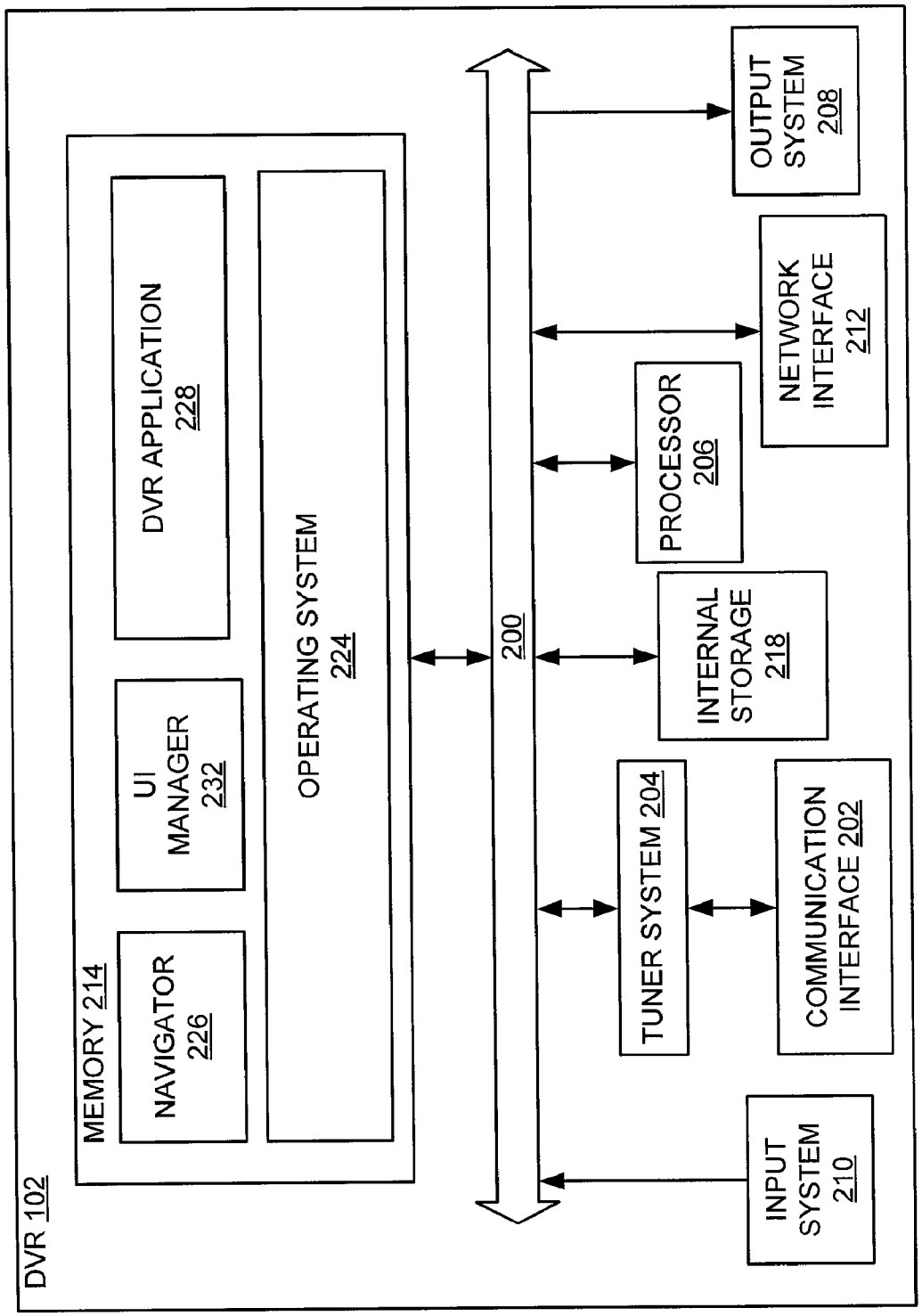
FIG. 2 depicts a block diagram of selected system components of an exemplary embodiment of the DVR of FIG. 1

FIG. 2 is a block diagram depicting selected system components of an exemplary embodiment of the DVR 102 of FIG. 1. Omitted from FIG. 2 are a number of conventional components, known to those skilled in the art, that are unnecessary to explain the operation of the disclosed systems and methods.

FIG. 2 depicts several components commonly communicating through a local bus 200. For example, DVR 102 may include a communications interface 202 for receiving video, audio and other media signals from media signal source 104 (FIG. 1). Communications interface 202 can comprise, for example, an Ethernet interface, an IEEE-1394 interface, a USB (Universal Serial Bus) interface, a serial interface, a parallel interface, a wireless radio frequency (RF) interface, a telephone line interface, a power line interface, a coaxial cable interface, and/or an infrared (IR) interface, among others.

DVR 102 also includes a tuner system 204 which could include, for example, a tuner for receiving and/or selecting one or more selected channels or digital streams of media signals. Tuner system 204 could comprise one or more tuner resources (not depicted). Such tuner resources may be broadly referred to herein as tuners. It should be understood that, in some instances, tuner system 204 can include one or more tuners configured for receiving analog media signals, while in some embodiments, tuner system 204 is configured with one or more tuners configured for receiving digital media signals. In some instances, tuner system 204 could even be configured with one or more tuners configured to receive both analog and digital media signals. For example, in one instance, a first tuner of tuning system 204 receives an analog video signal corresponding to a first media content instance and a second tuner of tuner system 204 receives a digital compressed stream corresponding to a second media content instance.

DVR 102 can further include at least one processor 206 for controlling the operations of the DVR 102 and an output system 208 for driving a playback device (e.g., television 106). An input system 210 can receive user inputs provided via a wired or wireless input device such as, for example, a hand-held remote control, a transmitter with buttons or keys located on the exterior of the DVR, and/or a keyboard.

Network interface 212 can transmit and/or receive data over a network such as a local-area network (LAN), wide-area network (WAN), or the Internet. For example, data may be transferred to/from another DVR, or a centralized server through network interface 212. Such data could be media signals and or other data, such as, among others, programming information, or other data capable of being stored and or displayed to the user. Network interface 212 may comprise, for example, an Ethernet interface, an IEEE-1394 interface, a USB interface, a serial interface, a parallel interface, a wireless RF interface, a telephone line interface, a power line interface, a coaxial cable interface, and/or an infrared IR interface, among others.

Memory 214, which can include volatile and/or non-volatile memory, stores one or more programmed software applications, routines, drivers, or other functional elements (herein broadly referred to as applications), which contain instructions that are executed by processor 206, potentially under the direction of an operating system 224. Input data used by an application can be stored in memory 214 and read by processor 206 as needed during the course of the application's execution. This input data may be data stored in memory 214 by a secondary application or other source, either internal or external to DVR 102, or may be data that was created with the application at the time it was generated as a software application program. Other logic may also be stored in memory 214 for operation of the DVR 102.

Internal storage 218 may comprise a recordable medium and may be a number of devices available for non-volatile data storage, such as, among others, a hard disk drive (HDD), optical drive, or flash memory, for example. Although depicted as separate components, internal storage 218 and memory 214 could even be the same device. Internal storage 218 may be used for storing media data, such as encoded media content received through communication interface 202 and/or network interface 212. It should be understood that media content can be digitally encoded before being stored on recordable medium by the DVR itself or by means external from the DVR, such as the media signal source or a cable set-top box. Media content may be stored as media data on the recordable medium in an encrypted or unencrypted state.

User input received during the course of execution of any processes implemented by DVR 102 may be received from an input device (not shown) via input system 210, transmitted through the bus 200, at least temporarily stored within memory 214, and communicated to processor 206. Data generated by an application may be stored in memory 214 by processor 206 during the course of the application's execution. Availability, location, and amount of data generated by one application for consumption by another application can be communicated by messages through the services of operating system 224, among others. Hence, preferences for the operation of the DVR functions can be input by, among others, a subscriber using an input device such as a remote control and/or remotely under the control of an entity other than the user (e.g. by a command or other configuration change transmitted from the cable head-end). Changes to decision-making logic associated with the applications described herein can be made by a variety of mechanisms under software control.

A navigator application 226 provides a navigation framework for services provided by DVR 102. Navigator 226 registers for, and in some cases reserves, certain user inputs related to navigational keys such as channel increment/decrement, last channel, favorite channel, etc. Navigator 218 also provides users with television (or other programming) related menu options that correspond to DVR functions such as, for example, providing an interactive program guide, blocking a channel or a group of channels from being displayed in a channel menu, recording particular channels, playback of recorded shows, etc.

Under user instruction, DVR application 228 can perform the general tasks of recording and/or and playing back received programs, among other functions. Applications, such as navigator 226 and DVR application 228, can utilize services provided by user interface (UI) manager 232 and/or other graphics utilities provided by operating system 224 to draw dialog boxes, menus, graphics, etc. for display on playback device 106. UI manager 232, according to some embodiments, uses window management and graphics utilities provided by the operating system 224 for presenting a user interface (i.e. through television 106). According to some embodiments, UI manager 232 may co-operate with the operating system 224 to allocate screen areas and managing screen use among the various applications. Accordingly, UI manager 232 can provide the user interface for the DVR. Accordingly, UI manager 232 may, for example, be directed by DVR application 228 to display information regarding the selection and/or input related to the residual time-buffering systems and methods describer herein.

The applications executed by DVR 102 can comprise executable instructions for implementing logical functions. The applications can be embodied in any computer-readable medium for use by or in connection with an instruction execution system. The instruction execution system may be, for example, a computer-based system, a processor-containing system, or any other system capable of executing or interpreting instructions. In the context of this document, a "computer-readable medium" can be any means that can contain, store, communicate, propagate, or transport the program for use by or in connection with the instruction execution system, apparatus, or device.

The computer-readable medium can be, for example, but is not limited to, an electronic, solid-state, magnetic, optical, electromagnetic, infrared, or semiconductor system, apparatus, device, or propagation medium, either internal to DVR 102 or externally connected to the DVR 102 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Now that DVR 102 has been described generally, a number of scenarios for managing media content received by the DVR 102 is described. Some of such embodiments are generally related to systems and methods for implementing residual time-shift buffering schemes within digital media recording devices.

As described in the background, it is known to use one or more time-shift buffers (TSB), which may also be referred to in the art as circular buffers, for receiving and temporarily storing media content received by DVR 102 or other digital recording devices.

In addition to directly receiving and directing live media content into a TSB, it has become increasingly desirable to record permanent (i.e., linear recordings) from the TSB as also generally described, for example, in commonly assigned U.S. Patent Application No. 2003/0108331, which is incorporated by reference herein in its entirety. Among other potential benefits, such methodology provides a more desirable user experience in comparison to directing media content directly from a tuner into a linear recording.

According to some conventional designs, a DVR scheduler is used to trigger stop/start recording events at the start and end time of each scheduled recording. These events are separate from a DVR recorder application which receives these events and allocates the necessary resources (i.e. tuner, TSB), directs the tuner to tune to a desired channel and/or stream, begins the TSB recording, and initiates the conversion process. At the end time of the scheduled recording, the recorder application finalizes the conversion process, waits for the conversion to complete, stops the TSB recording, releases the tuner and TSB resources, then notifies the scheduler that the recording is complete. This notification of the completion of the recording indicates to the scheduler that the tuner and/or TSB resources are available for pending scheduled recordings.

However, in the case of embodiments of residual time-shift buffering described herein, DVR recorder application and/or DVR scheduling application (the functions of which may be implemented by one or the other of DVR application 228 and operating system 230) can be configured such that media content continues to be directed to a TSB through its respective tuner even after a linear recording is complete or a service context is no longer associated with the TSB, such as if a user tunes to another channel. This can be advantageous in instances in which, for example, among other situations, another scheduled recording happens to begin on the same channel immediately after the first of a back-to-back recording or if the user decides to return to that channel for viewing after a channel change or PIP swap. According to such a residual time-shift buffering design, according to some embodiments, the DVR scheduler need not be aware of the actual resources, such as the tuners and/or TSBs, used to complete the recordings.

FIG. 3 depicts a simplified block diagram 300 of an embodiment of the DVR 102 of FIG. 2 which can be used to describe the operation of a DVR having the above described operability and to assist in the description of various embodiments of residual time-shift buffering that can be used to further enhance a user's experience with media devices designed to direct media data to a TSB. Thus, FIG. 3 depicts the general operation of a DVR that is configured to direct media content first through a TSB buffer 306-310, including media content to be recorded to a more permanent linear recording 318. For example, media content is delivered from media signal source 104 to DVR 102 over one or more communication channels 110. A tuner resource, such as tuners 302 and 304 of tuner system 204 are each configured to receive desired media content and provide the media content to one of TSB 306, TSB 308, or TSB 310.

According to some embodiments TSBs 308-310 are logically created during a boot-up sequence of DVR 108. For example, their creation may include the allocation of space (i.e. memory locations) within a storage device, such as internal storage 218. Once created, TSBs 308-310 can form a logical pool of buffers that can be selected and associated with tuners 302 and 304 in order to store media content therein.

Although two tuners 302 and 304 are depicted, DVR 102 may include any number of tuners. Likewise, although a pool of only three logical TSBs 308-310 are depicted, other embodiments may use more or less buffers. However, according to some embodiments, a tuner is associated with only one of the TSBs in the pool of buffers at any one time. For example, according to the depicted embodiment, tuner 304 is associated with TSB 306 and tuner 302 is associated with TSB 308 at the depicted moment in time. However, at another time, tuner 302 or 304 can be logically associated with TSB 310, for example.

Media content received by tuner 302 or 304 is stored into the TSB logically associated with the respective tuner. In some instances, a service context can be associated with a TSB. For example, service context 314 is depicted as being associated with TSB 306 and service context 316 is associated with buffer 308. A service context can be, among others, the display of the media content from an associated buffer, such as in a main display or a picture-in-picture (PIP) display. Thus, in one embodiment, service context 314 represents a main display of media content in a television, while service context 316 represents a PIP display.

Even if media content is being directed to a respective TSB, it is not necessary that a service content be associated with the TSB. According to some embodiments, portions of media content directed to a TSB can be stored to a linear recording for more permanent storage than is afforded by the TSB. Thus, with reference to FIG. 3, once a portion of media content is stored into TSB 306, the media content is converted into a linear recording 318. More specifically, according to some embodiments, an application such as the DVR application 228 (FIG. 2) or operating system 224 (FIG. 2) maintains the TSBs 306-310 by creating and updating a management file associated with the media content stored to a respective TSB. The management file can serve as an index to a plurality of data clusters that represent the media content. According to some embodiments, the management file may also maintain, among other information about the media content, guide information describing the content stored therein. However, in other embodiments, guide information or other information describing the media content are stored in other data files. In order to convert the portions of the media data stored to the TSB into a linear recording, a similar management file is created for the linear recording and the data clusters and related information previously found in the TSB are associated with the management file for the linear recording.

The time to start such a conversion operation can be configurable, or dictated by factors such as when a notification is received that such conversion is desired. However, it should be understood that the conversion of any particular portion of the received media content in TSB 306 occurs before the media content desired to be stored as linear recording 318 is overwritten by incoming media content in TSB 306. Typically, especially for scheduled recordings, the media content is converted relatively soon after being stored to the TSB 306. It is not necessary for a scheduled recording to be stored into a TSB in its entirety before beginning such a conversion process. Rather, portions of media content can be converted to the linear recording as soon as it is stored within the TSB.

Although only one linear recording 318 is depicted, it should be understood that any of the available TSBs can be used for a linear buffer conversion, and these conversions could even be performed simultaneously (or substantially simultaneously). Additionally, depending on available storage space, any number of desired linear recordings can be stored for an indefinite length of time.

One potential side-effect of recording permanent recordings through a circular-buffer conversion, however, is that the conversion process introduces a latency between the time that a portion of media content is received and the time that that the portion of media content finishes conversion from the TSB to the linear recording. Depending on a number of factors, such as the amount of media content to be converted, among other factors, the process of performing this conversion can be time consuming.

Accordingly, even if the conversion is being performed substantially in real-time as the media content is received into the TSB, there can be a delay of several seconds between the time that a portion of media content is first stored to the TSB and the time that the portion of media content is converted into the linear recording. The latency between when a portion of media content is first stored to the TSB and when that portion of media content is converted into the linear recording is described in more detail with respect to FIGS. 4-7.

Although certain embodiments of FIG. 3 have been described as directing media content through a service context and/or to a linear recording through a TSB, some embodiments could route media content from one of the tuners 302, 304 directly into a linear recording and/or service context. In this respect, it should be understood that the simplified block diagram of FIG. 3 is non-limiting and depicts only examples of possible paths for media content.

FIG. 4 is a graphical user interface (GUI) 400 depicting an exemplary program guide that can be displayed by the UI manager application 232 of DVR 102. GUI 400 can display media content such as television programming, along with its associated show times, dates, and related information. Among other potential uses, GUI 400 can be used by a user to select a channel in order to view live television on that channel through the TSB or to select media content to be recorded, more permanently, to a linear recording.

As depicted, the television show "RAYMOND" is available (e.g., via download or broadcast) from 8:00 PM until 8:30 PM on channel 2. Likewise, the television show "FRIENDS" is available from 8:30 PM to 9:00 PM on channel 2. Accordingly, the shows RAYMOND and FRIENDS are made available consecutively on the same channel. That is, according to this example, no other media content is to be received between RAYMOND and FRIENDS on channel 2. As indicated by the depicted star-shaped icons, RAYMOND and FRIENDS have been selected by a user as being scheduled to be recorded into a permanent recording.

Thus, with reference back to FIG. 3, at or before 8:00 PM an available tuner 302 or 304 of DVR 102 will tune to channel 2 in order to begin directing media content associated with the television show RAYMOND to one of the available TSBs 306-310. At a time before media content associated with the television show RAYMOND is overwritten by other incoming media content in the selected TSB, the media content is converted into a linear recording, such as linear recording 318. A similar procedure is used to record the show FRIENDS into a linear recording.

FIG. 5 depicts a buffer-content diagram 500 depicting the contents of a TSB with respect to time when recording back-to-back media content. Specifically, diagram 500 depicts instances of media content, RAYMOND 502 and FRIENDS 504, being consecutively recorded to a TSB, such as TSB 306, along time dimension 506. Although diagram 500 depicts only media instances RAYMOND 502 and FRIENDS 504, other previously or later stored media content that has not been overwritten may also exist within the same TSB.

At time 510, a user changes the channel to channel 1, causing an available tuner to begin to receive media content on channel 1. Accordingly, at this time, media content appearing on channel 1 is directed from a first tuner to a first TSB. This action is not shown in FIG. 5. However, with reference to FIG. 3, tuner 302 can be used to receive the media content on channel 1 and direct the media content into TSB 308, for example. The media content received on channel 1 can then be displayed via an associated service context 316, which could be a display output of a television.

At time 512, media instances RAYMOND 502 and FRIENDS 504 are selected by a user for recording into a linear recording. For example, as described previously, the user may select desired media instances (i.e., RAYMOND and FRIENDS) to be stored into a linear recording using the guide depicted in the GUI 400 of FIG. 4.

At time 514, which could be 8:00 PM as shown in the guide of FIG. 5, DVR application 228 determines whether a tuner resource is available to record the media instance RAYMOND 502 as scheduled at time 512. For example, the exemplary DVR 102 of FIG. 3 includes dual tuners 302 and 304, allowing the instance of media content, RAYMOND 502, to be received, directed to a TSB and converted to a linear recording while the user simultaneously watches desired live media content, such as DEAL OR NO DEAL, on channel 1. However, in the case that DVR 102 includes only a single tuner, DVR 102 acquires the tuner resource currently being used to receive the media content on channel 1 in order to allow RAYMOND 502 to be received on channel 2, directed to an available TSB, and stored into the linear recording as scheduled.

However, according to the present embodiment, it is assumed that a second tuner is available. Here, in this case, again referring back to FIG. 3, if tuner 302 is used for receiving live media content (e.g. DEAL OR NO DEAL) on tuner 302, tuner 304 can be used for the purposes of receiving RAYMOND 502. Thus, at time 514, RAYMOND 502 is received through the tuner 304 and begins to be directed into TSB 306. Additionally, also at time 514, the media instance conversion of RAYMOND 502 into a more permanent linear recording can commence. It should be understood that, in some instances, the conversion could be started at a later time, even at a time after the entire media content instance of RAYMOND 502 has been stored to TSB 306.

According to some embodiments, the recording of RAYMOND 502 can be performed without directing media content in the TSB 306 to a service context. In this case, no service context is associated with TSB 306. Such a recording may be referred to herein as a background recording. However, in another embodiment, service context 316 corresponds to a main display on television 106 and service context 314 represents a PIP within the main display, allowing the user to view the media content received on channel 1 (via tuner 302 and TSB 308) on the main display through service context 316 and view the media content from channel 2 (via tuner 304 and TSB 306) in the PIP display through service context 314.

Looking back to FIG. 5, at time 516, the media instance RAYMOND 502 has been completely stored into the TSB. Unlike conventional approaches, however, in that the second instance of media content, FRIENDS 504, occurs directly after RAYMOND 502, DVR 102 is configured to continue directing media content from the second tuner into TSB 306 for at least a predetermined duration of time, without flushing or resetting TSB 306.

FIG. 6 depicts a diagram 600 depicting the contents of exemplary linear recordings used to store media content converted from a TSB with respect to time. For example, FIG. 6 depicts a linear recording 602 of RAYMOND as converted from the media instance RAYMOND 502 in the TSB of FIG. 5, and linear recording 604 containing the media content instance FRIENDS as converted from FRIENDS 504 in the TSB of FIG. 5.

As discussed above, the process of converting the media content from a TSB into a linear recording takes a period of time. Thus, although the instance of media content RAYMOND 502 may begin the linear recording conversion at time 514, corresponding converted media content received at time 514 is not converted and stored into the linear recording of RAYMOND 602 until time 606, which could be several seconds or minutes later, for example. Likewise, despite that RAYMOND 502 may have finished being directed into the TSB at time 516, the end of the conversion process does not occur until after time 516 (e.g., at time 608). FIG. 7, described below, better illustrates the delay between the start and end of conversion of a portion of an instance of media content.

Specifically, FIG. 7 is a composite timing diagram 700 depicting the contents of the TSB 306 of diagram 500 and the linear recordings of diagram 600. Notably, a duration of time 702 exists between the time 516 that media instance RAYMOND 502 (FIG. 5) has been completely stored into the respective TSB and the time 608 that RAYMOND 602 (FIG. 6) has been converted from the TSB into the linear recording.

According to conventional designs, at the end of conversion when the first linear recording is considered complete, the TSB resource used to temporarily hold RAYMOND 502 for the linear recording is stopped and released resulting in any previously buffered content being flushed from the TSB if the associated channel is not currently selected for viewing by the end user (i.e., a background recording) so that the TSB resource may be made available for buffering and possibly converting subsequent instances of media content to a linear recording captured from the same or different tuner associated with the TSB. Unfortunately, such a design has negative consequences for recording the next instance of media content FRIENDS 504 which appears subsequent to RAYMOND 502 on the same channel. Specifically, any portion of the next instance of media content FRIENDS 504 directed into the TSB while the conversion of RAYMOND 502 into RAYMOND 602 is in progress cannot be used for the conversion of FRIENDS 504 into FRIENDS 604 because the contents of the TSB are flushed after the conversion of RAYMOND 502 into RAYMOND 602 is complete. Further, according to conventional designs, a new TSB resource cannot be assigned to the tuner associated with said TSB until the conversion of RAYMOND 502 into RAYMOND 602 is complete or cancelled prior to completion. Therefore, only the portion of the media content instance FRIENDS 504 directed into a newly established TSB session (e.g., using TSB 306), which started after the conversion of RAYMOND 502 completes, is available for conversion. In other words, a portion of the media content instance FRIENDS 504 that corresponds to at least the length of the duration of time 702 is not stored to any TSB at the time the conversion is initiated, and therefore is also unable to be converted to the linear recording of FRIENDS 604.

However, using residual time buffering embodiments described herein, media data continues to be directed through tuner 304 into the same TSB 306 used to store the first media content instance RAYMOND 502 for at least a predetermined duration of time. As will be explained in more detail below, such behavior proves beneficial, for example, when another recording of an instance of media content starts directly after the prior recording (i.e. a back-to-back recording) or if the user surfs to the channel being buffered (residually) for viewing.

According to some instances, the predetermined duration that the media content continues to be directed into TSB 306 is at least as long as the duration 702, which is the time period extending between the time that the second media instance FRIENDS 504 begins being directed into the TSB and the time that the first media instance RAYMOND 502 finishes its conversion into the linear recording.

According to some embodiments, the predetermined duration could be set to other values, which may be, among others, preconfigured, configurable by a user setting, or configurable by a multiple-service operator (MSO). It can be advantageous in some embodiments to use the predetermined duration as opposed to allowing media data to continue to be directed into the buffer indefinitely. For example, allowing media data to be directed into the buffer indefinitely can affect power-saving functionality and/or wear-and-tear to storage devices used for the TSB.

Accordingly, one potential benefit for residual time-shift buffering, according to the embodiments of FIGS. 5-7, is allowing the second scheduled recording of the back-to-back recordings being received on the same channel or stream to be performed using the same TSB. This is in contrast to conventional approaches of stopping and restarting a TSB in between the back-to-back recordings, which can result in undesirable content loss at the beginning of the second recording.

The same principles used above that continue to direct a media content into a TSB after the end of a recording can, in some embodiments, also be advantageously applied to PIP swapping and channel changing.

For example, FIGS. 8-10 depict simplified block diagrams of DVR 102 in various exemplary PIP configurations. Each of FIGS. 8-10 depict an associated display within television 106 that is perceived by a user based on the selected PIP configuration. In each of FIGS. 8-10, media content that is received through tuners 304 and 306 is directed into respective TSBs 306 and 308. Specifically, an instance of media content received by tuner 304 represents video of a dog, and an instance of media content received by tuner 302 represents a video of a boat. Accordingly, in each of FIGS. 8-10, tuner 304 directs media content representing the dog into TSB 306, while tuner 302 directs media content representing the boat into TSB 306. FIG. 11 depicts a representation of the contents of TSB 306 of FIGS. 8-10 over a duration of time 1102. Similarly, FIG. 12 depicts a representation of the contents of TSB 308 of FIGS. 8-10 over the duration of time 1102.

FIG. 8 depicts a first exemplary DVR configuration 800 when service context 314 (a main display 314a of television 106) is associated with TSB 306, and service context 316 (PIP display 316a of television 106) is associated with TSB 308. For example, this could be the configuration at time 1102 of FIGS. 11 and 12. FIG. 9 depicts a second exemplary DVR configuration 900 in which service context 314 is associated with TSB 306 and service context 316 is associated with TSB 308. For example, this could be the configuration at time 1104 of FIGS. 11 and 12.

Accordingly, the swapping of service contents depicted in the change from configuration 800 to configuration 900 may be referred to as a PIP swap. Notably, despite that the service context attached to each TSB 306 and 308 is swapped at time 1104, the video of the dog received through tuner 304 continues to be directed to TSB 306 and the video of the boat received through tuner 302 continues to be directed to TSB 308. Specifically, according to some embodiments, the video of the dog received through tuner 304 continues to be directed to TSB 306 for at least a predetermined duration of time 1106. Thus, the predetermined duration of time 1106 can be defined by the time period beginning at the time that the PIP swap occurs (e.g. time 1104) and ending at time 1108. According to some embodiments, the predetermined duration 1106 can be, among others, preconfigured, configurable by a user setting, or configurable by a multiple-service operator (MSO). It can be advantageous in some embodiments to provide such a value for the predetermined duration as opposed to allowing media data to continue to be directed into the buffer indefinitely. For example, allowing media data to be directed into the TSB indefinitely can negatively affect power-saving operations of DVR 102 and/or wear-and-tear to storage devices used for the TSB 306.

Once ending time 1108 of duration 1106 is reached, the TSB 306 can be configured to stop buffering content from tuner 304 unless other conditions are met. For example, such a condition that buffering should continue is the case that TSB 306 is attached to a service context at the ending time 1108. Thus, according to such an embodiment, assuming that a subsequent PIP swap occurs at a time within the duration 1106, a user is advantageously able to access media content buffered within TSB 306. For example, at time 1110, a user may switch back to the configuration 800 of FIG. 8 to view the video of the dog stored in TSB 306 within the main display 314a of television 106 and viewing the video of the boat in TSB 308 within the PIP display 316a. Accordingly, similar to the embodiment described above, DVR 102 continues to direct the video of the boat into TSB 308 for at least a predetermined duration of time 1112, having a beginning time corresponding to the time of the second PIP swap 1110 and ending at time 1114.

However, FIG. 10 illustrates a third exemplary DVR configuration 1000 in which service context 314 is associated with TSB 306 and service context 316 is no longer associated with a TSB at all. This configuration can occur, for example, if the user instructs DVR to remove PIP display 316a from the television 106 in order to view the video of the dog without the overlay of PIP display 316a. For example, configuration 1000 is selected at time 1116 of FIGS. 11 and 12. According to one embodiment, DVR 102 determines at time 1114 (the end of predetermined duration 1112) that no service context is attached to buffer 308. Thus, media content from tuner 302 no longer continues to be directed to TSB 308 at time 1114, although media content from tuner 304 continues to be directed into TSB 306 for display within service context 314a.

In addition to the swapping between a main display and the PIP display, residual time-shift buffering can also be beneficial in instances in which the user turns the PIP display off, then turns PIP display back on before the predetermined duration is over. Another instance where residual time-shift buffering can improve the user's experience is in instances in which the user turns PIP display off, then surfs to the channel or stream previously being displayed in the PIP display, before the predetermined duration is over. In both cases, the media data in the respective TSB for the initial PIP display is preserved, and the buffered media content remains available to the user (e.g. for playback, recording, etc.).

Although the embodiments of FIGS. 8-10 are depicted and described as routing all media content through a TSB, this is merely one embodiment. According to some embodiments, media content is directed to at least one service context directly from the tuner, bypassing the TSB. Additionally, in some embodiments, a user may be viewing previously recorded content from a linear recording in a first service context while viewing content received at one of tuners 302, 304 in a second service context. As a non-limiting example, a user may view a baseball game through tuner 304 and TSB 306 in the PIP display (e.g. service context 316), while viewing pre-recorded content from a linear recording in the main display (e.g. service context 314).

Similar residual time-shift buffer principles described above for use with back-to-back recordings and PIP swapping can also be beneficially applied to channel changes. For example, FIGS. 13-15 depict simplified block diagrams of DVR 102 in various exemplary channel configurations. Each of FIGS. 13-15 also depict an associated display within television 106 that is perceived by a user based on the channel configuration. FIG. 16 depicts an exemplary representation of the contents of TSB 306 of FIGS. 13-15 over a duration of time 1602. Similarly, FIG. 17 depicts a representation of the contents of TSB 308 of FIGS. 13-15 over the duration of time 1602.

Looking specifically to FIG. 13, a first DVR configuration 1300 is depicted at a time after a user first selects a first instance of media content to be displayed within television 106. For example, a user may select media content, which could, for example, correspond to a television show from the channel guide displayed by the DVR 102 in FIG. 2. The selected media content can correspond media content transmitted on a first channel tuned by tuner 304. Here, the media content received at tuner 304 is a video of a dog. The video of the dog is received by tuner 304 and directed into TSB 306. Service context 314, which corresponds to the main display 314a of television 106 is then associated with TSB 306. At this time, tuner 302, TSB 308, and service context 316 are unused. A user may select configuration 1300 at time 1602 (FIGS. 16 and 17). As shown, TSB 308 (FIG. 17) remains empty at time 1602, while TSB 306 (FIG. 16) begins to store the video of the dog at time 1602.

FIG. 14 depicts a second DVR configuration 1400 at a time after a user selects a second instance of media content to be displayed within television 106, such as when a user changes the channel. For example, a user may select different media content (e.g. a different television show) from a channel guide displayed by the DVR 102. Here, the selected media content received at tuner 302 is a video of a boat. The video of the boat is received by tuner 302 and begins to be directed into TSB 308. Service context 314 is disassociated with TSB 306 and associated with TSB 308. Although the service context association has been changed, TSB 306 continues to receive the video of the dog directed from tuner 304 for at least a predetermined duration of time. For example, this service context re-association occurs at time 1604 of FIGS. 16 and 17, and the predetermined duration of time can be represented by duration 1606.

FIG. 15 depicts a third DVR configuration 1500 at a time after a user, once again, selects the first instance of media content (the video of the dog) to be displayed within television 106. For example, a user may return to viewing the instance of media content previously viewed in configuration 1300 of FIG. 13.

According to one embodiment, the user returns to viewing the video of the dog before the end of the predetermined duration of time 1606. For example, looking to FIGS. 16 and 17, the user can return to viewing the first instance of media content at time 1610, which occurs before the end of duration 1606 (marked by time 1608). In this case, at time 1610, service context 314 is disassociated with TSB 308 and re-associated with TSB 308. Accordingly, the user is able to view any content previously recorded to TSB 306, including the content directed to TSB 306 while the user viewed content from TSB 308.

As with the PIP embodiments described above, in some embodiments, because there is an active service context associated with TSB 306, media content continues to be directed to TSB 306 even after the end of predetermined duration 1606. However, if there is no service context associated with the TSB at the end of the predetermined duration, media content is no longer directed into the TSB. For example, looking to FIG. 17, the predetermined duration 1612 extends through time 1614. However, no service context is associated with buffer 308 at time 1614. Accordingly, DVR 102 stops directing media content into TSB 308, resets the TSB 308 and returns it to the pool of available TSBs. As a consequence, if the channel tuned by tuner 308 is selected again, only media content received after the DVR 102 re-tunes to this channel is available for viewing.

Regardless of the scenario (e.g. channel surfing, PIP, etc.) that residual time shift buffering is used, it may be necessary to resolve tuner resource conflicts if a user or the DVR scheduler requests tuner resources while residually buffering content to a TSB. According to one embodiment, a policy for resolving tuner resource conflicts is used by DVR application 228 and/or operating system 224. According to one embodiment, residual time-shift buffering is set at a lower priority than buffering media content due to specific initiated requests, such as those from a user or from a scheduler.

For example, consider the situation in a dual tuner environment, such as depicted with the DVR of FIG. 3, in which a user surfs to a first channel "A" for a short while, then surfs to channel "B" for a short while, then surfs to channel "C." In this exemplary embodiment, the predetermined duration of residual time-shift buffering can be set to 30 seconds. If the user stays on channel "A" for 10 seconds and then channel "B" for 5 seconds, then a tuner and TSB resource conflict scenario arises when the user requests to present channel "C" because channels "A" and "B" are still being residually buffered in the background. To resolve this situation, one exemplary policy can specify that one of the residual time-shift buffering activities is terminated to free up resources for presenting channel "C," rather than denying the user the ability to change the channel to channel "C." In other words, new residual time-shift buffering is set at a lower priority than new requests initiated by the user. For example, according to the some embodiments, the TSB used for receiving media content on channel A or channel B may be released in order to allow content to be received on channel C.

The resources to be freed can be determined based on a number of factors, including being based on the length of time spent viewing the particular channels and/or which channel was viewed last, among other possibilities. Thus, according to the example above, if the resources to be freed are determined based on the length of time spent viewing the particular channels, one embodiment may free the tuner/TSB used to record content on channel B since channel B was viewed for less time than channel A (perhaps indicating that a user is less interested in the media content on channel B in comparison to the content on channel A). However, if the resources to be freed are determined based on which channel was viewed last, the tuner/TSB used to record content on channel A can be freed for viewing the contents on the selected channel C. Such an embodiment may presume that a user is more likely to switch back to the channel having the most previously viewed media content. According to some embodiments, the policy could be user configurable or remotely configurable (e.g. under instructions received by the cable head-end or other remote server).

Conditional language, such as, among others, "can," "could," "might," or "may," unless specifically stated otherwise, or otherwise understood within the context as used, is generally intended to convey that certain embodiments, among others, include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, steps, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

It should be emphasized that many variations and modifications may be made to the above-described embodiments. All such modifications and variations are intended to be included herein within the scope of this disclosure and protected by the following claims.

At least the following is claimed:

1. A method for managing time-shift buffering in a digital media recording device, comprising:
   receiving media content through at least a first tuner of the digital media recording device, the media content comprising at least a first instance of media content received consecutive to a second instance of media content;
   directing the first instance of media content into a first time-shift buffer, the first instance of the media content received through the first tuner of the digital media recording device;
   after directing the first instance of the media content into the first time-shift buffer, directing the second instance of media content into one of the first time-shift buffer and a second time-shift buffer while continuing to direct media content received through the first tuner of the digital media recording device into the first time-shift buffer for at least a predetermined duration of time wherein directing the second instance of media content into one of the first time-shift buffer and the second time-shift buffer while continuing to direct media content received through the first tuner of the digital media recording device into the first time-shift buffer for the predetermined time comprises directing the second instance of media content into the second time-shift buffer through a second tuner;
   attaching a service context to the first time-shift buffer;
   detaching the service context from the first time-shift buffer; and
   attaching the service context to the second time-shift buffer.

2. The method of claim 1, wherein the first instance of media content and the second instance of media content are received consecutively through the first tuner, the first instance of media content and the second instance of media content being sequentially directed into the first time-shift buffer from the first tuner, the method further comprising:
   converting at least a portion of the first instance of media content directed to the first time-shift buffer into a linear recording at a time when directing a portion of the second media instance received through the first tuner of the digital media recording device into the first time-shift buffer.

3. The method of claim 2, further comprising: converting the second media instance directed to the first time-shift buffer into a linear recording at a time after converting the first media instance into a linear recording.

4. The method of claim 3, wherein the predetermined duration that the media content continues to be directed into the first buffer is at least as long as the time period extending between the time that the second media instance begins being directed into the time-shift buffer and the time that the first media instance finishes conversion into the linear recording.

5. The method of claim 1, further comprising: determining whether a tuner resource is available at a designated time in order to direct the second instance of media content into one of the first time-shift buffer and the second time-shift buffer while continuing to direct media content received through the first tuner of the digital media recording device into the first time-shift buffer for at least the predetermined duration of time, the designated time being substantially the same time that the first media instance has finished being directed into the first time-shift buffer.

6. The method of claim 5, further comprising: after the predetermined duration, discontinuing the direction of the media content received through the first tuner of the digital media recording device into the first time-shift buffer.

7. The method of claim 6, further comprising:
   attaching a first service context to the first time-shift buffer;
   detaching the first service context from the first time-shift buffer upon determining that the tuner resource is available; and
   reattaching the first service context to the first time-shift buffer before the predetermined duration has elapsed.

8. The method of claim 6, wherein the stop of directing the second instance of media content into one of the first time-shift buffer and the second time-shift buffer while continuing to direct media content received through the first tuner of the digital media recording device into the first time-shift buffer for the predetermined time comprises directing the second instance of media content into the second time-shift buffer through a second tuner, and the method further comprises:

attaching a first service context to the first time-shift buffer;
attaching a second service context to the second time-shift buffer;
detaching the first service context from the first time-shift buffer and detaching the second service context from the second time-shift buffer; and
attaching the second service context to the first time-shift buffer before the predetermined duration has elapsed.

9. The method of claim 6, wherein discontinuing the direction of the media content received through the first tuner of the digital media recording device into the first time-shift buffer after the predetermined duration is performed if the first time-shift buffer is not used for directing media content to a linear recording or service context at the end of the predetermined duration.

10. The method of claim 1, further comprising:
detaching the service context from the second time-shift buffer; and
reattaching the service context to the first time-shift buffer before the predetermined duration has elapsed.

11. A digital media recording device comprising:
a memory for storing logic; and
processing circuitry configured to execute the logic, the logic configured for:
receiving media content through at least a first tuner of the digital media recording device, the media content comprising at least a first instance of media content received consecutive to a second instance of media content;
directing the first instance of media content into a first time-shift buffer, the first instance of the media content received through the first tuner of the digital media recording device;
after directing the first instance of the media content into the first time-shift buffer, directing the second instance of media content into one of the first time-shift buffer and a second time-shift buffer while continuing to direct media content received through the first tuner of the digital media recording device into the first time-shift buffer for at least a predetermined duration of time;
determining whether a tuner resource is available at a designated time in order to direct the second instance of media content into one of the first time-shift buffer and the second time-shift buffer while continuing to direct media content received through the first tuner of the digital media recording device into the first time-shift buffer for at least the predetermined duration of time, the designated time being substantially the same time that the first media instance has finished being directed into the first time-shift buffer;
after the predetermined duration, discontinuing the direction of the media content received through the first tuner of the digital media recording device into the first time-shift buffer;
attaching a first service context to the first time-shift buffer;
detaching the first service context from the first time-shift buffer upon determining that the tuner resource is available; and
reattaching the first service context to the first time-shift buffer before the predetermined duration has elapsed.

12. The digital media recording device of claim 11, wherein the first instance of media content and the second instance of media content are received consecutively through the first tuner, the first instance of media content and the second instance of media content being sequentially directed into the first time-shift buffer from the first tuner, wherein the logic further comprises logic configured for: converting at least a portion of the first instance of media content directed to the first time-shift buffer into a linear recording at a time when directing a portion of the second media instance received through the first tuner of the digital media recording device into the first time-shift buffer.

13. The digital media recording device of claim 12, wherein the logic further comprises logic configured for: converting the second media instance directed to the first time-shift buffer into a linear recording at a time after converting the first media instance into a linear recording.

14. The digital media recording device of claim 13, wherein the predetermined duration that the media content continues to be directed into the first buffer is at least as long as the time period extending between the time that the second media instance begins being directed into the time-shift buffer and the time that the first media instance finishes conversion into the linear recording.

15. The digital media recording device of claim 11, wherein the logic for directing the second instance of media content into one of the first time-shift buffer and the second time-shift buffer while continuing to direct media content received through the first tuner of the digital media recording device into the first time-shift buffer for the predetermined time comprises logic for directing the second instance of media content into the second time-shift buffer through a second tuner, and wherein the logic further comprises logic configured for:
attaching a first service context to the first time-shift buffer;
attaching a second service context to the second time-shift buffer;
detaching the first service context from the first time-shift buffer and detaching the second service context from the second time-shift buffer; and
attaching the second service context to the first time-shift buffer before the predetermined duration has elapsed.

16. The digital media recording device of claim 11, wherein the logic configured to discontinue the direction of the media content received through the first tuner of the digital media recording device into the first time-shift buffer after the predetermined duration is performed if the first time-shift buffer is not used for directing media content to a linear recording or service context at the end of the predetermined duration.

17. The digital media recording device of claim 11, wherein the logic for directing the second instance of media content into one of the first time-shift buffer and the second time-shift buffer while continuing to direct media content received through the first tuner of the digital media recording device into the first time-shift buffer for the predetermined time comprises logic for directing the second instance of media content into the second time-shift buffer through a second tuner, and the logic further comprises logic configured for:
attaching a service context to the first time-shift buffer;
detaching the service context from the first time-shift buffer; and
attaching the service context to the second time-shift buffer.

18. The digital media recording device of claim 17, wherein the logic further comprises logic configured for:
detaching the service context from the second time-shift buffer; and
reattaching the service context to the first time-shift buffer before the predetermined duration has elapsed.

19. A system for managing time-shift buffering in a digital media recording device, the system comprising:
- means for receiving media content through at least a first tuner of the digital media recording device, the media content comprising at least a first instance of media content received consecutive to a second instance of media content;
- means for directing the first instance of media content into a first time-shift buffer, the first instance of the media content received through the first tuner of the digital media recording device;
- means for, after directing the first instance of the media content into the first time-shift buffer, directing the second instance of media content into one of the first time-shift buffer and a second time-shift buffer while continuing to direct media content received through the first tuner of the digital media recording device into the first time-shift buffer for at least a predetermined duration of time wherein directing the second instance of media content into one of the first time-shift buffer and the second time-shift buffer while continuing to direct media content received through the first tuner of the digital media recording device into the first time-shift buffer for the predetermined time comprises directing the second instance of media content into the second time-shift buffer through a second tuner;
- means for attaching a service context to the first time-shift buffer;
- means for detaching the service context from the first time-shift buffer; and
- means for attaching the service context to the second time-shift buffer.

20. The system of claim 19, wherein the first instance of media content and the second instance of media content are received consecutively through the first tuner, the first instance of media content and the second instance of media content being sequentially directed into the first time-shift buffer from the first tuner, the method further comprising:
- means for converting at least a portion of the first instance of media content directed to the first time-shift buffer into a linear recording at a time when directing a portion of the second media instance received through the first tuner of the digital media recording device into the first time-shift buffer.

21. The system of claim 20, further comprising: means for converting the second media instance directed to the first time-shift buffer into a linear recording at a time after converting the first media instance into a linear recording.

22. The system of claim 21, wherein the predetermined duration that the media content continues to be directed into the first buffer is at least as long as the time period extending between the time that the second media instance begins being directed into the time-shift buffer and the time that the first media instance finishes conversion into the linear recording.

23. The system of claim 19, further comprising: means for determining whether a tuner resource is available at a designated time in order to direct the second instance of media content into one of the first time-shift buffer and the second time-shift buffer while continuing to direct media content received through the first tuner of the digital media recording device into the first time-shift buffer for at least the predetermined duration of time, the designated time being substantially the same time that the first media instance has finished being directed into the first time-shift buffer.

* * * * *